United States Patent [19]

Yamagishi et al.

[11] Patent Number: 5,011,624
[45] Date of Patent: Apr. 30, 1991

[54] ACRYLATE POLYMER-DISPERSED LIQUID CRYSTAL MATERIAL AND DEVICE MADE THEREFROM

[76] Inventors: Frederick G. Yamagishi, 247 Mesa Ave., Newbury Park, Calif. 91320; Leroy J. Miller, 8313 Hillary Dr., Canoga Park, Calif. 91304

[21] Appl. No.: 453,077

[22] Filed: Dec. 19, 1989

Related U.S. Application Data

[63] Continuation of Ser. No. 139,402, Dec. 30, 1987, abandoned.

[51] Int. Cl.$^5$ .............................................. C09K 19/54
[52] U.S. Cl. .......................... 252/299.5; 252/299.01; 428/1; 350/350 R; 350/347 V; 350/320
[58] Field of Search ........................ 252/299.01, 299.5; 428/1; 350/350 R, 347 V, 320

[56] References Cited

U.S. PATENT DOCUMENTS

| | | | |
|---|---|---|---|
| 3,620,889 | 11/1971 | Baltzer | 252/299.01 |
| 3,935,337 | 1/1976 | Taylor | 350/350 R X |
| 4,101,207 | 6/1978 | Taylor | 350/344 |
| 4,671,618 | 6/1987 | Wu | 252/299.01 |
| 4,673,255 | 6/1987 | West et al. | 350/347 V |
| 4,685,771 | 8/1987 | West et al. | 350/347 V |
| 4,688,900 | 8/1987 | Doane et al. | 350/347 V |
| 4,728,547 | 3/1988 | Vaz et al. | 428/1 |
| 4,869,847 | 9/1989 | Leslie et al. | 252/299.01 |
| 4,890,902 | 1/1990 | Doane et al. | 350/347 V |
| 4,891,152 | 1/1990 | Miller et al. | 252/299.01 |

FOREIGN PATENT DOCUMENTS

| | | | |
|---|---|---|---|
| 0272585 | 6/1988 | European Pat. Off. | 252/299.01 |
| 0282963 | 9/1988 | European Pat. Off. | 252/299.01 |
| 8701822 | 3/1987 | PCT Int'l Appl. | 252/299.01 |

OTHER PUBLICATIONS

Montgomery, G. P. et al., Appl. Optics, 26, 738, 1987.
Vaz, N. A. P. et al., Mol. Cryst. Liq. Cryst., 146, 1, 1987.
Frost, L., Pigm. Resin. Technol. 16(9), 9–12, 1987.
Grechko, L. G. et al., Ukr. Fiz. Zh. (Russ.) 32(8), 1213–1216, 1987.
West, J. L., Phase Separation of Liquid Crystals in Polymers, Mol. Cryst. Liq. Cryst., vol. 157, pp. 427–441, 1988.
Pappas, S. P. et al., in Ultraviolet Light Induced Reactions in Polymers, Chapter 2, American Chemical Society, 1976.

Primary Examiner—Robert L. Stoll
Assistant Examiner—Richard Treanor

[57] ABSTRACT

A composite material includes droplets of a liquid crystal material dispersed within a matrix of a photopolymerized polymer. The material is prepared by forming a solution of the liquid crystal material and a monomer, and then polymerizing the monomer with light. The solubility of the liquid crystal material in the polymer is less than in the monomer. As polymerization progresses, a portion of the liquid crystal material separates as a second phase in the polymer matrix. The liquid crystal can be any suitable such material that is soluble in the monomer and less so in the polymer, and the monomer is a polymerizable acrylate or methacrylate. Liquid crystal devices are prepared by forming the composite material between two electrically conducting substrates.

14 Claims, 1 Drawing Sheet

ACRYLATE POLYMER-DISPERSED LIQUID CRYSTAL MATERIAL AND DEVICE MADE THEREFROM

This is a continuation of application Ser. No. 139,402, filed Dec. 30, 1987, now abandoned.

BACKGROUND OF THE INVENTION

This invention relates to materials whose optical properties are responsive to external stimuli, and, more particularly, to a liquid crystal containing material.

Liquid crystals are materials which are liquids in the conventional sense of being a condensed state that is flowable. They contain long molecules of particular structures which exist in an oriented arrangement wherein many molecules are aligned with respect to each other. In a basic liquid crystal cell used in display devices, liquid crystals are placed between two sheets of a transparent conductor material, so that the liquid crystals are oriented in a selected manner. Upon application of an electric field, the liquid crystal molecules reorient in another manner. This reorientation is used to control the transmission of the cell to polarized light passed through the cell.

The basic liquid crystal cell just described is operable with many types of liquid crystal materials, but the design of the cell is cumbersome to use in some applications. The cell can be used to control polarized light, so that a polarizer is required. Since the liquid crystal remains a liquid within the cell, leakage of the liquid crystal material from the cell, or introduction of contaminants into the cell, can significantly interfere with the operation of the device. The preparation of curved or irregularly shaped displays, and the mass production of displays, is also difficult with this approach. Often, cost and weight considerations make this type of design inappropriate for particular applications.

Another approach to controlling the transmission of a cell to light is to divide the liquid crystal material into small droplets positioned between the transparent electrodes. If a liquid crystal is segregated into discrete droplets, the orientations of molecules within adjacent droplets are not correlated. However, the alignment of molecules in previously randomly oriented droplets can be achieved by an electric field applied to the transparent electrodes.

A different contrast mechanism operates when the liquid crystal molecules are provided in small droplets rather than in a continuous thin film between the electrodes, so that the cell can control light that is not previously polarized. When the molecules in the various droplets of a liquid crystal material are randomly oriented with respect to those in adjacent droplets, the liquid crystal scatters and does not transmit the light. Upon alignment of the molecules in the adjacent droplets, incident light is more readily transmitted through the bulk of the liquid crystal in the direction of the long axis of the liquid crystal molecules. This contrast mechanism depends upon scattering of light, not upon polarization effects, and is therefore useful with unpolarized light.

In one type of device, droplets or bubbles of the liquid crystal material are dispersed through the matrix of a transparent solid to form a composite material. The liquid crystal material and the transparent solid are selected to have matched indices of refraction. The liquid crystal material within the droplets is sealed against leakage and intrusion of contaminants. The droplets of liquid crystal are typically about 0.2 micrometer or greater in size and of irregular size and shape distribution, and often dispersed throughout the solid in a somewhat irregular distribution. Nevertheless, the solid matrix with the encapsulated droplets of liquid crystal experiences the same transition in optical transparency when an electrical field is applied, and can therefore be used in displays. Further, the use of plastic substrates that are coated with an optically transparent conductive layer and containing the composite material would allow for the preparation of large sheets which could be cut and shaped as needed.

Although such encapsulated liquid crystal materials are useful, their commercial use is inhibited by a lack of controllability in preparation and processing of the liquid crystal composite material. Processing usually requires heating of the encapsulated material, a step that is somewhat difficult to control. The droplets of liquid crystal material may be irregularly shaped and sized, and the liquid crystal material may vary from region to region in its response to an applied voltage.

There therefore exists a need for an improved technique for preparing liquid crystals encapsulated within a matrix to form composite materials for use in displays and other devices. The present invention fulfills this need, and further provides related advantages.

SUMMARY OF THE INVENTION

The present invention provides a composite material wherein droplets of a liquid crystal material are dispersed throughout a matrix of a polymer material. The droplets are uniform in size and characteristics, and are uniformly distributed through the solid polymer material to a greater degree than prior encapsulated liquid crystal materials. The invention also provides a process for preparing such composite materials, using relatively few steps and with a technique that allows the process to be applied in a variety of situations. Variations of the processing technique permit the characteristics of the composite material to be varied. The composite material can be made to be rigid or flexible, and with various degrees of contrast and transparency. This material can be used to make display devices of high quality, also as provided by the invention.

In accordance with the invention, a composite material comprises a plurality of droplets of a liquid crystal material within a matrix of a polymer of a photopolymerizable monomer derived from acrylic acid, the liquid crystal having a solubility in the polymer that is less than its solubility in the corresponding monomer. Such monomers include, but are not limited to, monomers derived from acrylic acid and methacrylic acid, including but not limited to, acrylates and methacrylates.

In accordance with another aspect of the invention, a process for preparing a composite material comprises the steps of preparing a solution of a monomer derived from acrylic acid, which is photopolymerizable to a polymer, a liquid crystal material, the solubility of the liquid crystal material being greater in the monomer than in the polymer, and a photoinitiator; and exposing the solution to light to polymerize the monomer to a polymer, whereupon at least a portion of the liquid crystal material separates into a separate phase within a matrix of the polymer.

The liquid crystal material is initially mixed with a monomer in which it is soluble, forming a liquid solution of monomer and liquid crystal. The liquid crystal material is not, however, present in solution as a separated, discrete phase having a phase boundary with the monomer. In the solution, no droplets of the liquid crystal material are present. By contrast, if a mixture were present instead, then there would be separate, identifiable droplets of the liquid crystal present throughout the processing.

The monomer material is chosen to be a composition that dissolves the liquid crystal material, and also polymerizes under the influence of light by photopolymerization. After forming the solution of liquid crystal and monomer, the monomer is photopolymerized under an appropriate light. To aid in photopolymerization, a photopolymerization initiator is ordinarily mixed into the solution as it is formed.

As the monomer polymerizes, the liquid crystal becomes less soluble. Droplets of the liquid crystal therefore are formed within the polymer as it is polymerizing from the monomer. In the preferred approach, these droplets are fairly uniformly dispersed throughout the polymer volume, as the solution had an essentially uniform distribution of the liquid crystal prior to formation of the droplets. The liquid crystal material cannot diffuse large distances through the solid as the droplets are formed, with the result that there is a uniform spatial distribution of droplets.

The size and shape of the droplets are also uniform throughout the volume. Because the droplets are formed where none existed previously, there are no constraints or controls exerted on the droplets as they form and grow. Since all of the regions of the polymer volume are essentially similar, particularly for relatively thin pieces, all of the droplets are similar when formed. Because the distribution of droplets is uniform, the droplets are nearly all of the same size, another advantage in preparing a display material.

The liquid crystal material is preferably present in an amount of from about 10 to about 60 percent of the total volume of the solution of liquid crystal material, photoinitiator, and monomer (before polymerization). The volume fraction of liquid crystal material is established by the amount mixed with the monomer and photoinitiatormonomer, prior to polymerization. The final characteristics of the composite material are, to some extent, determined by the amount of liquid crystal material added. For amounts at the lower end of the indicated range, less than about 20 volume percent, the droplets are generally small, in the submicron range, and discrete. The polymer matrix material is smooth. This structure results in increased transmission of light when the electric field is applied. For amounts at the higher end of the indicated range, greater than about 40 volume percent, the droplets are larger in size. The polymer matrix is then composed of a series of coagulated spherical particles. This structure results in increased scattering and opaqueness when no electric field is applied. Within each of these ranges, the size of the droplets is also determined in part by the rate of polymerization. The faster the polymerization, the smaller the droplets.

Any liquid crystal material having a positive dielectric anisotropy can be used, as long as it is soluble in the monomer chosen and is sufficiently less soluble in the polymer formed from the monomer to obtain phase separation into droplets. Mixtures of, and containing, cyanobiphenyl liquid crystals are preferred, but the invention is not so limited. For example, cyclohexylphenyls, pyrimidines, and cyanophenylbenzoates can also be used as the liquid crystal material.

The monomer with which the liquid crystal is mixed, and which is photopolymerized, is an acrylate. Acrylates photopolymerize rapidly. A wide variety of physical properties, such as refractive index, stability, durability, flexibility, and strength, can be tailored into the polymer matrix through the choice of particular acrylates. The choice of the refractive index of the polymer is particularly important, as the use of a polymer matrix having a refractive index equal to the ordinary refractive index of the liquid crystal material results in increased transmission when an electric field is applied. This index match affords the highest transmission. Scattering of light when no electric field is applied is a function of the difference between the refractive index of the polymer and the average refractive index of the liquid crystal, as well as the randomness of the orientation of the droplets and the size and concentration of droplets.

Three classes of acrylate monomers are presently preferred. One is an ester derived from acrylic acid having the structure

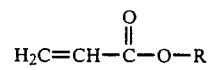

where R is selected from the group consisting of alkyl, aryl, hydroxyalkyl, and epoxyalkyl. Another is an ester derived from methacrylic acid having the structure

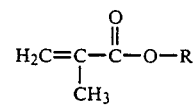

where R is selected from the group consisting of alkyl, aryl, hydroxyalkyl, and epoxyalkyl. The third is a monomer selected from the group consisting of an amide derived from acrylic acid and having the structure

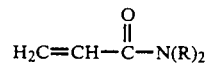

where R is selected from the group consisting of alkyl, aryl, hydroxyalkyl, and epoxyalkyl. All of these monomers can be polymerized with ultraviolet light in a relatively short time, without the need for heating the monomer.

The photoinitiator can be any such compound appropriate for polymerizing the selected monomer. Examples of useful initiators for acrylates are 2,2-diethoxyacetophenone, benzophenone, benzoyl peroxide, benzoin, benzil, 2,2-di-sec-butoxyacetophenone, benzil dimethyl ketal (2,2-dimethoxy-2-phenylacetophenone), 2,2-dimethoxy-2-hydroxyacetophenone, 2,2-diethoxy-2-phenylacetophenone, 2,2-dimethoxy-2-phenylacetophenone, benzoin n-butyl ether, benzoin sec-butyl ether, benzoin ethyl ether, benzoin methyl ether, benzoin iso-propyl ether, 4-benzoyl-4'-methyldiphenyl disulfide, 1-hydroxycyclohexylphenyl ketone, and 2-hydroxy-2-methyl-1-phenyl-propane-1-one.

In accordance with yet another aspect of the invention, a liquid crystal display device comprises a pair of spaced transparent conductive substrates; and a composite material disposed between said substrates, said composite material comprising a plurality of droplets of a liquid crystal material within a matrix of a polymer of a photopolymerizable acrylate monomer, the liquid crystal having a solubility in the polymer that is less than its solubility in the corresponding monomer. That is, a display device is prepared using the composite material of liquid crystal dispersed as droplets in a polymerized matrix, and placed between transparent, conducting electrodes. The display device normally scatters light when no electric field is applied and therefore appears opaque, and becomes transparent when a sufficient voltage is applied to the conducting electrodes.

It will be appreciated that the present invention provides an important advance in the field of materials utilizing liquid crystals, and the display devices incorporating liquid crystals. The composite materials containing liquid crystals as droplets dispersed in a polymer matrix, prepared by the process of the invention, provide good uniformity in a sealed material that can be readily processed into devices. No light polarizers are required. The wide variety in optical and mechanical properties of acrylates assures excellent flexibility in selecting properties for particular applications. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE PREFERRED EMBODIMENT

Figure 1:
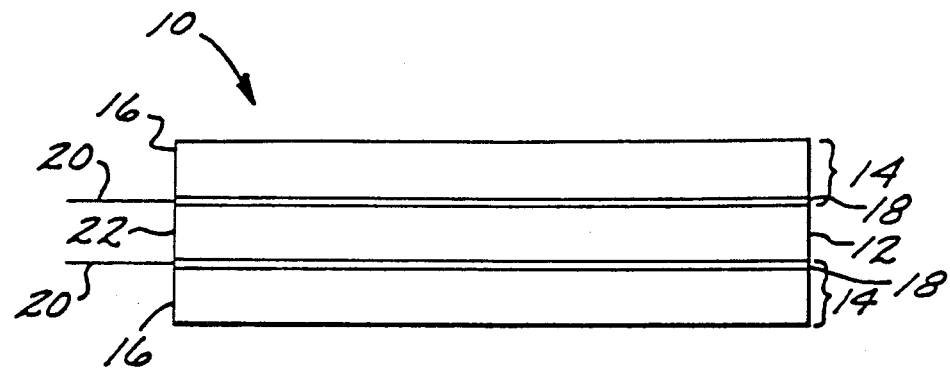
FIG. 1 is a side elevational view of a liquid crystal device utilizing the composite material of the invention.

FIG. 1 illustrates a liquid crystal display device 10. The device 10 includes an active element 12 sandwiched between two transparent electrodes 14. The transparent electrodes 14 can conveniently be glass pieces 16 that are coated on their inner surfaces with a thin coating 18 of an electrically conducting material such as indium tin oxide. External leads 20 are connected to each of the coatings 18 so that an electrical field can be applied between the electrodes 14, through the active element 12.

Figure 2:
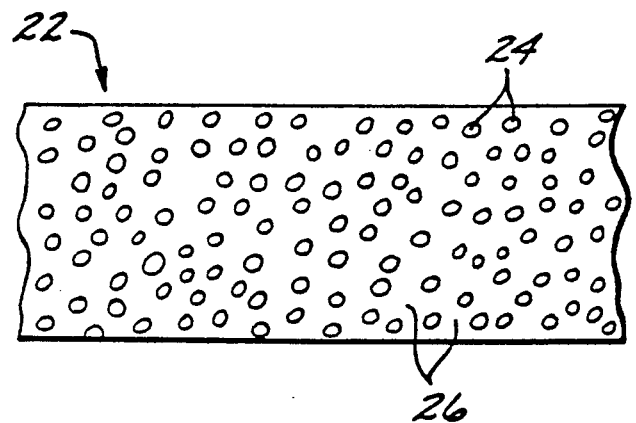
FIG. 2 is an enlarged sectional view of the composite material of the invention.

In accordance with the present invention, the active element 12 is a composite material. Such an active element 12 is shown in FIG. 2 as the composite material 22. The composite material 22 comprises a plurality of droplets 24, which can also be thought of as bubbles, of a liquid crystal material within a matrix 26 of a polymer of a photopolymerizable monomer. The liquid crystal material is soluble in the monomer, and its solubility is less in the photopolymerized polymer than in the monomer. The size of the droplets is typically about ¼ to about 15 micrometers, but larger droplets are observed and are acceptable. The thickness of the composite material 22, in the direction between electrodes 14, can be selected as needed for specific applications, but is generally in the range of a few micrometers to over 100 micrometers.

When no or a low voltage is applied to the leads 20, the liquid crystal material within each droplet 24 exhibits some degree of alignment with the adjacent walls of the droplet, due to the small size of the droplet. However, the liquid crystal material in the various droplets has no common alignment, and there is a generally random variation between the alignments of the liquid crystal molecules in the droplets 24, from one droplet to another. As a result, incident light directed through the composite material 22 is scattered, so that the device 10 is opaque. Depending upon the choice of the liquid crystal material, the matrix material, and the size, density, and distribution of the droplets 24, the device 10 in this "off" state may be opaque white, opaque colored if a dye is present in the liquid crystal material, or translucent so that a small amount of diffused light is transmitted.

When a sufficiently large voltage is applied to the leads 20, the director of each liquid crystal molecule in each of the droplets 24 tends to align with the electric field between the electrodes 14. There is a strong tendency for a common alignment of the liquid crystal molecules within the various droplets 24. In this "on" state, the liquid crystal material no longer strongly scatters the incident light. The device 10 then becomes more transmissive, so that a larger amount of light is transmitted.

The composite material active element is prepared by first forming a solution of three components, the liquid crystal material, a monomer that is subsequently polymerized to a polymer that forms the matrix, and a small amount of a photoinitiator that aids in photopolymerization of the monomer. The volume fraction of the liquid crystal is the fraction determined by dividing the volume of liquid crystal added to the solution by the total volume of the solution of liquid crystal, monomers, and photoinitiator, prior to polymerization of the monomers. The volume fraction preferably ranges from about 0.10 (10 percent) to about 0.60 (60 percent). The fraction of the volume of the total solid occupied by liquid crystal droplets, after photopolymerization, is approximately the same as the volume fraction herein defined. However, in some cases it will be slightly lower, as some (up to about 15 percent) of the liquid crystal may remain in solution in the polymer or be trapped within the polymer and not reach the liquid crystal droplets. This slight difference is encompassed within the term "about" as used herein to describe the volume fraction.

The liquid crystal material is preferably a cyanobiphenyl, but may be any liquid crystal material that is soluble in the monomer and less soluble in the resulting polymer.

The monomer is a monomer of an acrylate, herein defined as a molecule containing the acryloyl group, $CH_2=CHCO-$. Most preferably, the polymer material is polymerized from one or more of the three classes of acrylate monomers that are presently preferred. One is an ester derived from acrylic acid having the structure

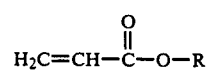

where R is selected from the group consisting of alkyl, aryl, hydroxyalkyl, and epoxyalkyl. Another is an ester derived from methacrylic acid having the structure

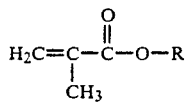

where R is selected from the group consisting of alkyl, aryl, hydroxyalkyl, and epoxyalkyl. The third is a monomer selected from the group consisting of an amide derived from acrylic acid and having the structure

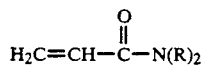

where R is selected from the group consisting of alkyl, aryl, hydroxyalkyl, and epoxyalkyl. Such monomers can be polymerized to the corresponding polymers, in the presence of the photoinitiator, in a relatively short time with ultraviolet light. Mixtures of acrylates can also be used, to achieve particular properties of the matrix.

The photoinitiator is preferably benzophenone or 2,2-diethoxyacetophenone, but may be any appropriate photoinitiator for the acrylate or acrylate mixture chosen. An effective amount of the photoinitiator, typically about 2 percent, by volume or weight, is supplied.

The solution of the three components is stirred until full solution is attained. The solution is then placed into a form that defines its shape upon polymerization of the acrylate. The solution is typically a slightly viscous liquid, so that application to the form is not difficult. The form might be a dish with sides, the space between the electrodes, or otherwise as appropriate. The present invention is particularly well suited for the preparation of large pieces of the composite material, from which smaller pieces can be later cut.

Polymerization is achieved by directing a light of appropriate wavelength and intensity toward the solution. Ultraviolet light is typically used. A mercury lamp which emits light in the 300 to 500 nanometer wavelength range, with the greatest intensity at about 365 nanometers, is preferred. With the assistance of the light energy and the photoinitiator, the monomer polymerizes in a time ranging from a few seconds to a few minutes.

As the photopolymerization proceeds, the liquid crystal material in solution becomes progressively less soluble in the polymerizing matrix material. Eventually, the solubility limit of the liquid crystal material in the polymerizing matrix is exceeded sufficiently that droplets 24 of the liquid crystal material are formed in the matrix 26 of the polymer. The droplets are fairly uniform in size, and are dispersed throughout the polymerized matrix in a generally uniform manner. This manner of formation of the droplets of the liquid crystal material has significant advantages over prior methods where the droplets were formed largely by mechanical means. Formation from solution ensures a uniform spatial distribution of the droplets and a uniform size, while mechanically formed droplets tend to have a more non-uniform distribution and a greater range of sizes. The present approach also permits easier preparation of the composite material, as the mixing need only extend to achieving full solution, not to achieving a uniform array of droplets by mechanical means.

The following examples are presented to illustrate aspects of the invention, and should not be taken as limiting of the invention in any respect.

EXAMPLE 1

Four parts by volume of 2-hydroxypropyl acrylate monomer were mixed with a sufficient amount of the photoinitiator benzophenone to account for 2 percent by weight of the total of the acrylate liquid, the liquid crystal, and the initiator. One part of the cyanobiphenyl liquid crystal mixture RO-TN-570, available from Hoffmann-LaRoche, was added to the monomer. The composition of the RO-TN-570 mixture is 51 weight percent of 4-cyano-4'-pentylbiphenyl, 25 weight percent of 4-cyano-4'-heptylbiphenyl, 16 weight percent of 4-cyano-4'-octyloxybiphenyl, and 8 weight percent of 4-cyano-4'-pentyl-p-terphenyl.

The mixture of acrylate liquid, liquid crystal, and photoinitiator was stirred for about 1 minute until complete solution was obtained. The solution, having a viscosity slightly greater than water, was placed between two conductive glass plates that serve as electrodes. The glass plates were previously coated on the inner sides (facing the solution) with a thin, electrically conductive coating of indium tin oxide. The spacing between the glass plates, which defines the thickness of the active element, was about 12 micrometers, and was established by using a premeasured Mylar spacer. The glass slides, with the solution therebetween, were placed under an ultraviolet light source. The source was a 350 watt, high pressure mercury lamp, enclosed in a lamp housing. The source emitted light in the 300 to 500 nanometer wavelength range, with the most intense light emitted at 365 nanometers. The total light intensity at the surface of the sample was about 60 milliwatts per square centimeter. Flood exposure of the entire cell lasted for three minutes, leading to polymerization of the acrylate. All of the mixing and processing was at ambient temperature.

The result was an opaque, highly light scattering film between the two glass plate electrodes. Distinct droplets of a size of from about ¼ to about 15 micrometers diameter were observed by scanning electron microscopy of a piece of the active element. The droplets were dispersed throughout the matrix.

When an electric potential of about 50 volts (RMS at 100 Hz) was applied to the active element through the glass plates, the active element became nearly completely transmissive to light.

EXAMPLE 2

Example 1 was repeated, except that an equivalent amount of the photoinitiator 2,2-diethoxyacetophenone was substituted for the benzophenone of Example 1. Polymerization occurred more rapidly, in about 1 minute. The results were otherwise similar to those of Example 1.

EXAMPLE 3

Example 1 was repeated, except that equal parts of 2-hydroxypropyl acrylate and RO-TN-570 liquid crystal were used. Polymerization was achieved in about 3 minutes, as in Example 1. The resulting film active element was highly light scattering when no field was applied. Its structure exhibited large, coagulated polymer spheres with the liquid crystal occupying the spaces between the spheres. The electro-optical results were otherwise similar to those of Example 1.

EXAMPLE 4

Example 3 was repeated, except that the photoinitiator 2,2-diethoxyacetophenone was substituted for the benzophenone. Polymerization was achieved in about 1 minute. The results were otherwise similar to those of Example 3.

EXAMPLE 5

Example 3 was repeated, except that N,N-dimethylacrylamide was substituted for the 2-hydroxylpropyl acrylate. Polymerization was achieved in about 2 minutes. The results were otherwise similar to those of Example 3.

The method of the present invention thus provides an improved liquid crystal-containing composite material that can be cut and shaped, and does not suffer degradation of the liquid crystal by introduction of contaminants. The resulting composite material can be readily tailored to achieve particular structural and optical characteristics as needed. Polymerization is accomplished by photopolymerization, so that mechanical stirring to produce bubbles and heating are not required. Although particular embodiments of the invention have been described in detail for purposes of illustration, various modifications may be made without departing from the spirit and scope of the invention. Accordingly, the invention is not to be limited except as by the appended claims.

What is claimed is:

1. A composite material, comprising a plurality of droplets of a liquid crystal material within a matrix of a polymer formed by mixing and then polymerizing by photoinduced reaction a mixture consisting essentially of a photopolymerizable monomer, a photoinitiator, and a liquid crystal having a solubility in the polymer that is less than its solubility in the corresponding monomer, wherein the monomer is selected from the group consisting of
   an ester having the structure

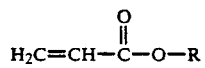

wherein R is selected from the group consisting of alkyl, aryl, hydroxyalkyl, and epoxyalkyl,
   an ester having the structure

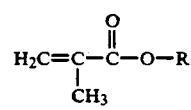

wherein R is selected from the group consisting of alkyl, aryl, hydroxyalkyl, and epoxyalkyl, and
   an amide having the structure

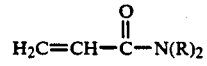

wherein R is selected from the group consisting of alkyl, aryl, hydroxyalkyl, and epoxyalkyl.

2. The composite material of claim 1, wherein the liquid crystal material occupies from about 10 to about 60 percent of the volume of the composite material.

3. The composite material of claim 1, wherein the liquid crystal material is dispersed throughout the polymer matrix as discrete droplets.

4. The composite material of claim 1, wherein the polymer is a polymer of a monomer having the structure;

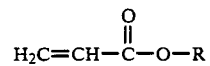

where R is selected from the group consisting of alkyl, aryl, hydroxyalkyl, and epoxyalkyl.

5. The composite material of claim 1, wherein the polymer is a polymer of a monomer having the structure;

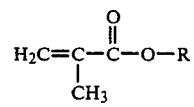

where R is selected from the group consisting of alkyl, aryl, hydroxyalkyl, and epoxyalkyl.

6. The composite material of claim 1, wherein the polymer is a polymer of a monomer having the structure

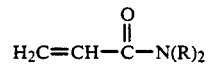

wherein R is selected from the group consisting of alkyl, aryl, hydroxyalkyl, and epoxyalkyl.

7. The composite material of claim 1, wherein the liquid crystal material is a cyanobiphenyl-containing mixture.

8. A liquid crystal display device, comprising:
   a pair of spaced transparent conductive substrates; and
   a composite material disposed between said substrates, said composite material comprising a plurality of droplets of a liquid crystal material within a matrix of a polymer formed by mixing and then polymerizing by photoinduced reaction a mixture consisting essentially of a photopolymerizable monomer, a photoinitiator, and a liquid crystal having a solubility in the polymer that is less than its solubility in the corresponding monomer, wherein the monomer is selected from the group consisting of an ester having the structure

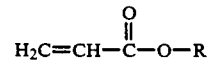

wherein R is selectected from the group consisting of alkyl, aryl, hydroxyalkyl, and epoxyalkyl,
   an ester having the structure

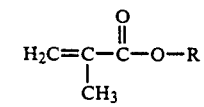

wherein R is selected from the group consisting of alkyl, aryl, hydroxyalkyl, and epoxyalkyl, and
   an amide having the structure

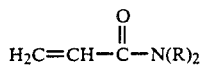

wherein R is selected from the group consisting of alkyl, aryl, hydroxyalkyl, and epoxyalkyl, 9. The display device of claim 8, wherein the liquid crystal material occupies from about 10 to about 60 percent of the volume of the composite material.

10. The display device of claim 8, wherein the liquid crystal material is dispersed throughout the polymer matrix as discrete droplets.

11. The display device of claim 8 wherein the polymer is a polymer of a monomer having the structure;

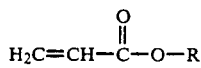

where R is selected from the group consisting of alkyl, aryl, hydroxyalkyl, and epoxyalkyl.

12. The display device of claim 8 wherein the polymer is a polymer of a monomer having the structure;

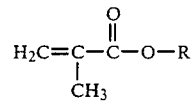

where R is selected from the group consisting of alkyl, aryl, hydroxyalkyl, and epoxyalkyl.

13. The display device of claim 8 wherein the polymer is a polymer of a monomer having the structure

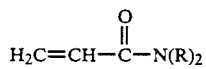

wherein R is selected from the group consisting of alkyl, aryl, hydroxyalkyl, and epoxyalkyl.

14. The display device of claim 8, wherein the liquid crystal material is a cyanobiphenyl-containing mixture.

* * * * *